July 9, 1968     J. ROSÁN     3,391,721
INSERT HAVING INTEGRAL INTERNAL THREAD LOCK
AND METHOD OF MAKING SAME
Filed Jan. 20, 1966     2 Sheets-Sheet 1

JOSÉ ROSÁN
INVENTOR.

BY
ATTORNEY

July 9, 1968

J. ROSÁN 3,391,721

INSERT HAVING INTEGRAL INTERNAL THREAD LOCK
AND METHOD OF MAKING SAME

Filed Jan. 20, 1966

JOSÉ ROSÁN
INVENTOR.

BY

ATTORNEY

United States Patent Office 3,391,721
Patented July 9, 1968

3,391,721
INSERT HAVING INTEGRAL INTERNAL THREAD LOCK AND METHOD OF MAKING SAME
José Rosán, San Juan Capistrano, Calif., assignor to Rosan Engineering Corp., Newport Beach, Calif., a corporation of California
Filed Jan. 20, 1966, Ser. No. 521,968
15 Claims. (Cl. 151—21)

ABSTRACT OF THE DISCLOSURE

Inserts having an internal thread lock without distorting the external configuration of the insert and a method for making the same.

---

The present invention relates generally to threaded inserts having internal thread locking means and to methods for making the same.

More particularly, the present invention relates to an improved threaded insert incorporating an integral thread lock on the interior thereof, and to a novel method for making said insert and internal thread lock without distorting the external configuration of the insert.

The threaded insert of the present invention is utilized to secure threaded members within a bore in a workpiece. Generally, this insert is comprised of a tubular body provided with internal and external threads thereon and is screwed into a tapped bore in a workpiece of relatively softer material. Thereafter, a fastener may be threaded into the insert a number of times without wearing away the threads mating therewith.

The insert of the present invention is made by internally tapping a tubular body so as to form threads therein. The insert is then externally ground to provide a true cylindrical configuration to the exterior thereof. Thereafter, a force is provided by an appropriate tool to the external surface of said body so as to form depressions thereon. Simultaneously, the crests and roots of the internal threads opposite the external depressions are deformed inwardly. The internal protrusions resulting therefrom will cause the internal threads in that area to be out of normal alignment with the remainder of the internal threads of the insert and, concomitantly, out of alignment with the threads of a mating fastener, thereby providing a positive friction or interference type lock. The external surface of the insert is again ground so as to restore a true cylindrical configuration thereto and to remove the depressions produced on the external surface of the body by the force applied to form the internal protrusions. External threads are then formed on the exterior of the insert body.

In the event it is desired to improve the metallurgical characteristics of the insert by heat-treating, the insert is preferably heat-treated immediately after it is tapped, and prior to the first external grinding operation. Thus, any deformation or distortion of the insert exterior resulting from the heat-treating process is eliminated.

The method of the present invention results in a threaded insert having a uniform external cylindrical configuration. By externally threading the insert body after forming the internal lock through the application of an external force to the insert body, the root and crest diameters of the external thread can thus be maintained constant throughout the length of the insert body. Because of the uniformity of the external threads of the insert, said insert may be more readily utilized where close tolerances are required between the internal threads of a bore in a workpiece and the external threads of the insert threaded therein.

The insert of the present invention and the method of making the same may incorporate one or more internal locks, as hereinabove described. The number of locks may be increased or decreased to comply with the requirement of the particular specification. Thus, the internal lock herein described, and the method of forming same, have the advantage over prior thread locking mechanisms in that said lock provides a greater flexibility in utilization. That is, whether one or more locks are used, each lock is identical. However, by increasing or decreasing the number of locks, the torque resisting forces would be varied accordingly.

Although it has been found that for fine threads the lock should extend over at least four internal threads to provide an optimum distribution of stress and at least two internal threads in the case of coarse threads, the lock may extend over any number of threads without departing from the principles of the instant invention.

In any event, the extent of the external indentation required to produce a particular internal thread lock is a function of the insert size and resilience of the insert material required to obtain sufficient locking properties to comply with the particular specification.

It is therefore an object of this invention to provide a threaded insert having an integral internal thread lock and a continuously uniform threaded exterior.

A further object is to provide a threaded insert capable of providing a positive uniform internal thread lock at various torque force levels.

Still another object is to provide a method of making an insert having an integral internal thread lock, and having a continuously uniform threaded exterior body.

A further object is to provide a method for making a threaded insert having an integral internal thread lock wherein said thread lock may be provided at any position along the circumference and longitudinal length of the insert interior.

Other objects and advantages of the invention will become apparent from the following description taken in conjunction with the accompanying drawings, in which.

Figure 1:
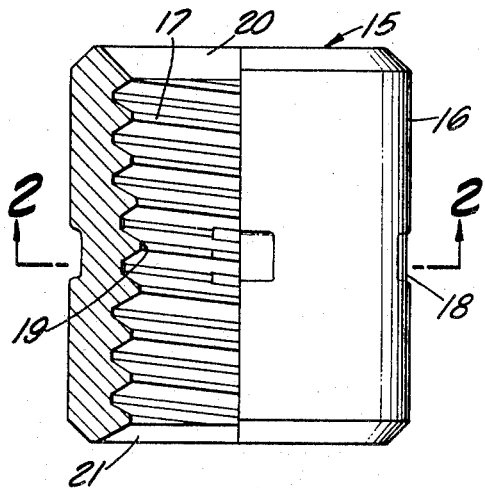
FIG. 1 is an elevational, partly sectioned view of an internally tapped tubular insert body after the formation of the internal thread lock therein, but before the forming of the external threads thereon.

Referring more particularly to FIG. 1, numeral 15 designates generally a tubular body having a smooth external wall 16 and an internal bore having threads 17. Tubular body 15 is shown with a plurality of external locking depressions 18 which are formed by an appropriate tool. The internal threads 17 opposite the external locking depressions 18 are inwardly deformed to provide internal locking protrusions 19. Although tubular body 15 is chamfered at 20 and 21 on its upper and lower end, respectively, said ends may also be provided with internal counterbores therein. Tubular body 15 as shown in FIG. 1 is in the condition following the second sizing (rounding) operation.

The body 15 is provided with a bore passing therethrough, which is tapped to provide an internal thread 17. After the internal thread 17 has been tapped within the tubular body 15, the outer wall 16 of the body is ground on a centerless grinder to render it as perfectly cylindrical as possible. Subsequent to rendering the tubular body 15 cylindrical, the thread lock is formed in the tubular body 15 by applying a radial force to the external wall 16 thereof, so as to provide one or more indentations or depressions 18 to said surface. Upon the indentation of said surface, the portions of the internal threads 17 which are opposite thereto are radially, inwardly deformed to provide protrusions 19, which are capable of frictionally interfering with the mating threads of a fastener threaded therein.

It should be noted that the internal thread lock is applied to the tubular body before forming the external threads thereon. Moreover, the external indentations 18 and, concomitantly, the inwardly extending protrusions 19 utilized to form the internal thread lock, may be of any size or configuration, provided said internal protrusions 19 produce sufficient locking properties in compliance with the particular specification requirements. Furthermore, indentations 18 and corresponding internal protrusions 19 may be positioned anywhere along the axial length of the internal circumference of tubular body 15.

As indicated above, because the dimensions and configurations of each of the internal locking protrusions are the same, the number of protrusions utilized to achieve a particular torque force level may consist of one or more. That is, if a particular specification requires a specific torque force level, additional internal locking protrusions may be provided. Conversely, when a high torque force level is not required, the number of internal locking protrusions may be reduced. Thus, the great flexibility of the internal thread lock described herein is clearly apparent.

After external locking depressions 18 and corresponding internal locking protrusions 19 are formed in tubular body 15, said body is again ground on a centerless grinder or the like to restore the external wall 16 thereof to a true or perfect cylindrical configuration and to remove locking depressions 18 from the external surface 16 of body 15 so that a subsequent threading process may be conducted.

Figure 2:
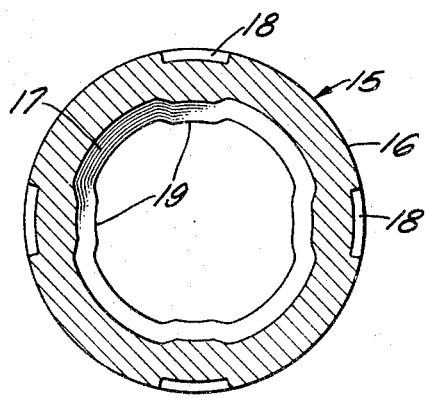
FIG. 2 is a cross sectional view, taken along the line 2—2 of FIG. 1, showing the relationship of the external depressions and the internal protrusions of the internal thread lock.

FIG. 2 is a cross sectional view of tubular body 15 shown in FIG. 1, taken on the line 2—2, illustrating the positions of the internal locking protrusions 19 relative to the external locking depressions 18.

Figure 3:
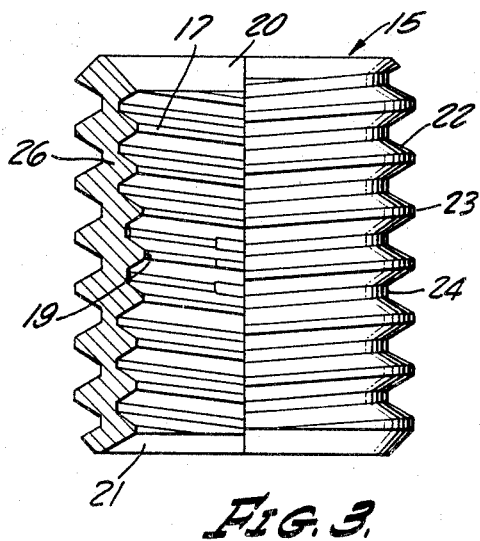
FIG. 3 is an elevational, partly sectioned view of the insert of FIG. 1 after the completion of the final external threading operation.

After the grinding operation, which is subsequent to providing the external locking depressions 18 to tubular body 15, threads 22 are formed on the external wall 16 of said tubular body, as illustrated in FIG. 3.

Threads 22 may be formed by any suitable process, such as grinding, cutting or rolling. Since external locking depressions 18 have been removed from external surface 16 of body 15 prior to the external threading process, constant root and crest diameters of the external threads 22 result. Thus, as aforesaid, because of the uniformity of external threads 22 of the insert, the insert may be more readily utilized where close tolerances are required between the internal threads of a bore in a workpiece and the external threads 22 of the insert threaded therein.

While the insert of FIG. 3 represents a preferred embodiment of the invention, it is to be understood that, if desired, a counterbore (not shown) and external peripheral serrations (not shown) may be positioned at the upper end of the insert and the counterbore wall may be expanded slightly so that the serrations engage the wall of the workpiece bore to prevent the insert from turning relative thereto.

Figure 4:
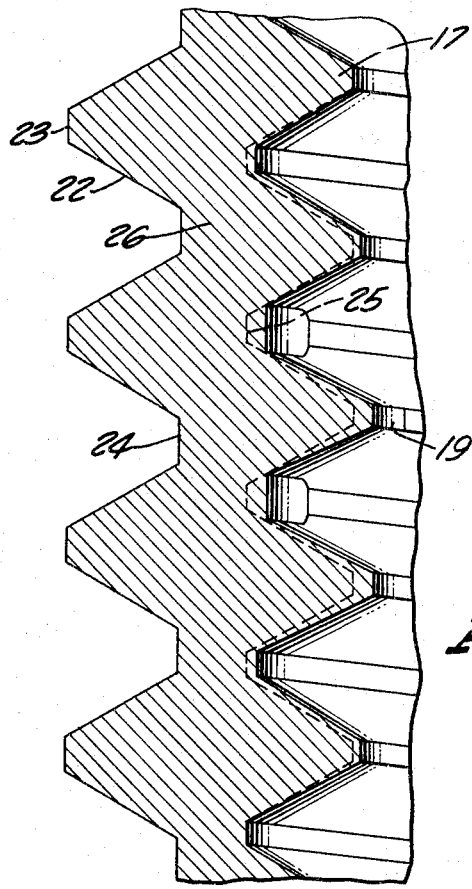
FIG. 4 is a greatly enlarged diagrammatical view of a portion of the insert of FIG. 3, illustrating the uniform contour of the external threads in the inwardly displaced portion of the internal threads comprising the internal thread lock.

FIG. 4 digrammatically illustrates a greatly enlarged fragmentary view of the internal locking protrusions 19. It will be noted that the crests 23 of external threads 22 are of constant height, regardless of their position along the exterior of the insert. It should further be noted that the roots 24 of the external threads 22 are also of uniform contour and height, even in the area opposite that of the internal locking protrusions 19. Dashed line 25 illustrates the configuration and position of the crests and roots of the internal threads 17, prior to the creation of the internal locking protrusions 19. Thus, the uniformity of the external threads 22 is clearly evident, even in the area adjacent internal locking protrusions 19.

The external thread 22 on the tubular body 15 lying over a thread lock region has a root diameter identical to that of the remainder of said external thread, as is best shown in FIG. 4. Thus, the columnar wall 26 has a minimum thickness corresponding to one-half of the difference between the root diameter of the external thread 22 and the root diameter of the internal thread 17 in the regions thereof axially spaced from the thread lock protrusions 19. In the thread lock regions, the thickness of the wall 26 will be slightly greater than it is at other points therealong, because the roots of the internal threads 17 in these regions have been moved radially inwardly from their normal position. This construction provides a tubular columnar wall 26 having substantially uniform columnar strength and flexure characteristics throughout its length.

Figure 5:
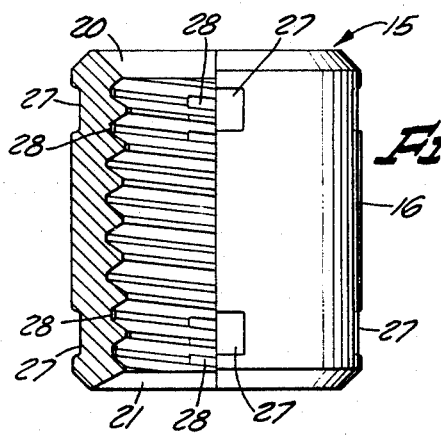
FIG. 5 is an elevational, partly sectioned view of an internally tapped tubular insert body after the formation of the internal thread lock therein comprised of a plurality of longitudinally spaced depressions, but before the forming of the external threads thereon.
Figure 6:
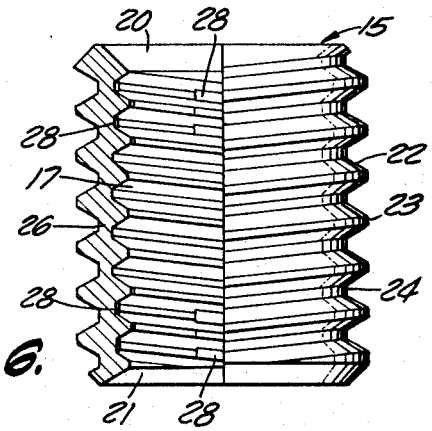
FIG. 6 is an elevational, partly sectioned view of the insert of FIG. 5 after the completion of the final external threading operation.

FIGS. 5 and 6 illustrate another embodiment of the invention wherein body 15 is provided with a plurality of external depressions 27 and resulting locking protrusions 28 similar to those shown in FIGS. 1–3, except that said protrusions 28 are arranged in longitudinally spaced relationship to each other rather than in lateral relationship. FIGS. 5 and 6 are in the same phase of the process cycle as the insert shown in FIGS. 1 and 3, respectively.

Figure 7:
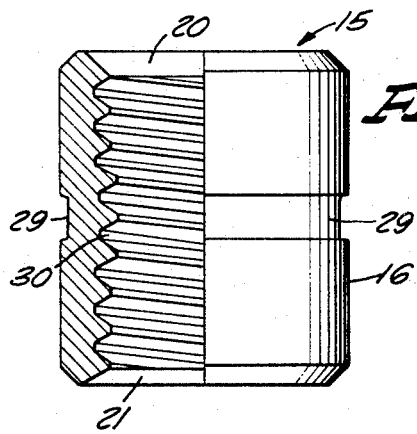
FIG. 7 is an elevational, partly sectioned view of an internally tapped tubular insert body after the formation of the internal thread lock therein comprised of a continuous depression extending completely about the circumference of the insert body, but before the forming of the external threads thereon.
Figure 8:
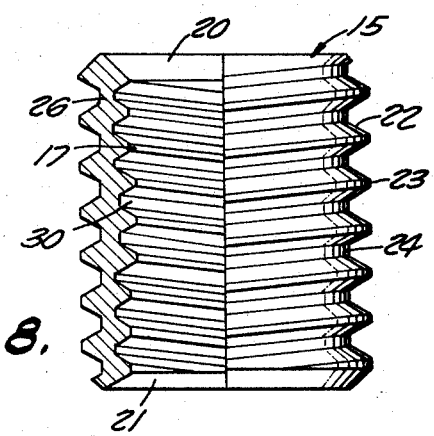
FIG. 8 is an elevational, partly sectioned view of the insert of FIG. 7 after the completion of the final external threading operation.

FIGS. 7 and 8 illustrate still another embodiment of the invention wherein the external depression and corresponding locking protrusions of body 15 are comprised of a continuous depression 29 which completely encircles the body 15, thereby providing a continuous internal locking protrusion 30 extending completely about the internal circumference of the body.

Figure 9:
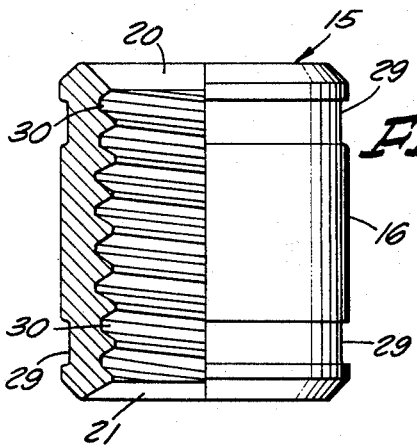
FIG. 9 is an elevational, partly sectioned view of an internally tapped tubular insert body after the formation of the internal thread lock therein comprised of a plurality of continuous depressions extending completely about the circumference of the insert body, but before the forming of the external threads thereon.
Figure 10:
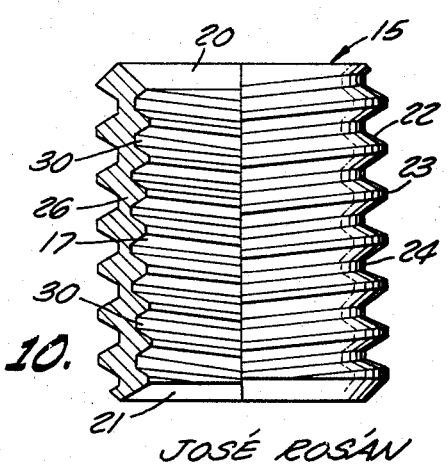
FIG. 10 is an elevational, partly sectioned view of the insert of FIG. 9 after the completion of the final external threading operation.

FIGS. 9 and 10 disclose another embodiment of the invention wherein the body 15 is provided with a plurality of the locking protrusions 30 illustrated in FIGS. 7 and 8.

In the foregoing figures, FIGS. 7 and 9 are in the same phase of the process cycle as FIG. 1, whereas FIGS. 8 and 10 are in the phase shown in FIG. 3. It should further be pointed out that the locking protrusions illustrated in FIGS. 7–10, inclusive, do not follow the convolutions of the internal thread, but rather lie in a broad plane normal to the body axis.

While several embodiments of the invention have been described, it is, of course, understood that the particular embodiments of the invention herein disclosed are for

I claim:

1. A one-piece insert provided with an integral internal thread lock comprising:
   a cylindrical body, said body provided with continuous external threads throughout the length of said body, said threads having uniform crest diameters and uniform root diameters throughout the length of said body;
   an internally threaded axial bore provided in said body having a continuous thread therein;
   protrusion means projecting into the internal bore laterally towards the body axis and are axially inwardly spaced from the internal thread convolutions adjacent the ends of said bore, said protrusion means comprised of a plurality of crests and roots of the threads of the internal bore so as to position the same out of normal axial and radial alignment relative to the remainder of said internal threads, thereby providing an internal thread lock.

2. An insert as described in claim 1 wherein said protrusion means extend completely about the circumference of the internal bore and the longitudinal dimension thereof is less than the longitudinal dimension of the insert body.

3. An insert as described in claim 2 wherein said protrusion means are comprised of a plurality of inwardly extending projections in longitudinally spaced relationship with each other.

4. An insert as described in claim 1 wherein said protrusion means has a circumferential dimension less than the internal circumference of the insert body.

5. An insert as described in claim 4 wherein said protrusion means has a longitudinal dimension less than the longitudinal dimension of the insert body.

6. An insert as described in claim 1 wherein said protrusion means is comprised of a plurality of inwardly extending projections each having a circumferential dimension less than the internal circumference of the insert, said projections being in longitudinally spaced relationship with each other.

7. An insert as described in claim 6 wherein said projections have a longitudinal dimension less than the longitudinal dimension of the insert body.

8. An insert as described in claim 1 wherein said protrusion means are comprised of a plurality of inwardly extending projections each having the circumferential dimension thereof less than the internal circumference of the insert, all of said projections being positioned in a plane which is normal to the axis of the insert and passes midway through the longitudinal dimension of each projection.

9. The method of making a threaded insert having an integral internal thread lock comprising the steps of:
   providing an axial bore in a cylindrical body;
   tapping said bore so as to provide threads therein;
   working the external surface of said body so as to render the same as perfectly cylindrical as possible;
   applying a force normal to the axis of said body so as to provide protrusion means extending into the internal bore, said protrusion means comprised of a plurality of crests and roots of said internal threads whereby said crests and roots are positioned out of normal alignment relative to the remainder of said internal threads and are axially inwardly spaced from the internal thread convolutions adjacent the ends of said bore;
   working the external surface of the body so as to provide a continuously uniform exterior surface thereto and a substantially true cylindrical configuration; and
   threading the external surface of said body to provide a continuous thread of uniform crests and uniform roots throughout the length of said body.

10. The method of making a threaded insert as described in claim 9 wherein the force applied to the external surface of the body so as to create said internally extending protrusion means is provided continuously about the external circumference of the body in a plane normal to the axis thereof, said force being applied in an area having a longitudinal dimension less than the longitudinal dimension of the body.

11. The method of making a threaded insert as described in claim 9 wherein the force which produces the inwardly extending protrusion means is applied intermittently in areas longitudinally spaced from each other on the body of said insert, said areas each having a circumferential dimension less than the circumference of the internal bore and a longitudinal dimension less than the longitudinal dimension of the insert body.

12. The method of making a threaded insert as described in claim 9 wherein the force applied to the external surface of the body so as to create said internally extending protrusion means is provided continuously about the external circumference of the body in a plurality of planes longitudinally spaced from each other and normal to the axis of the insert body.

13. the method of making a threaded insert as described in claim 9 wherein the force applied to the external surface of the body so as to create said internally extending protrusion means is provided in an area having a circumferential dimension less than the internal circumference of the insert body and the longitudinal dimension less than the longitudinal dimension of the insert body.

14. The method of making a threaded insert as described in claim 9 wherein the force which produces the inwardly extending protrusion means is applied intermittently in areas each having the circumferential dimension thereof less than the internal circumference of the insert, all of said areas being positioned in a plane normal to the axis of the insert body.

15. A one-piece insert provided with an integral internal thread lock comprising:
   a cylindrical body;
   an internally threaded axial bore in said body provided by tapping said axial bore so as to produce a continuous thread therein;
   protrusion means projecting into the internal bore laterally toward the body axis provided by applying a force normal to the axis of said body so that said protrusion means is comprised of a plurality of crests and roots of the threads of the internal bore which are positioned radially inwardly out of normal axial and lateral alignment relative to the remainder of said internal threads, and are axially inwardly spaced from the internal thread convolutions adjacent the ends of said bore thereby providing an internal thread lock; and
   providing a continuous external thread having uniform crest diameters and uniform root diameters throughout the length of said body by threading the external surface of said body.

References Cited

UNITED STATES PATENTS

| | | | |
|---|---|---|---|
| 3,163,197 | 12/1964 | Rosan et al. | 151—21 |
| 3,334,365 | 8/1967 | Rosan et al. | 151—21 |
| 1,083,217 | 12/1913 | McClellan. | |
| 2,054,393 | 9/1936 | Sharp | 151—22 |
| 2,395,037 | 2/1946 | Cole. | |
| 2,687,230 | 8/1954 | McPherson | 85—32 |

EDWARD C. ALLEN, *Primary Examiner.*

RAMON S. BRITTS, *Assistant Examiner.*